United States Patent
Sigoure et al.

(10) Patent No.: US 9,680,948 B2
(45) Date of Patent: Jun. 13, 2017

(54) SYSTEM AND METHOD FOR DEVICE FAILURE NOTIFICATION

(71) Applicant: Arista Networks, Inc., Santa Clara, CA (US)

(72) Inventors: Benoit Sigoure, San Francisco, CA (US); Kenneth James Duda, Menlo Park, CA (US); Douglas Gourlay, Menlo Park, CA (US)

(*) Notice: Subject to any disclaimer, the term of this patent is extended or adjusted under 35 U.S.C. 154(b) by 395 days.

(21) Appl. No.: 13/893,243

(22) Filed: May 13, 2013

(65) Prior Publication Data

US 2014/0280792 A1    Sep. 18, 2014

Related U.S. Application Data

(60) Provisional application No. 61/784,712, filed on Mar. 14, 2013.

(51) Int. Cl.
| | |
|---|---|
| *H04L 12/26* | (2006.01) |
| *H04L 29/08* | (2006.01) |
| *H04L 12/24* | (2006.01) |
| *H04L 29/14* | (2006.01) |

(52) U.S. Cl.
CPC .......... *H04L 67/28* (2013.01); *H04L 41/0654* (2013.01); *H04L 67/2861* (2013.01); *H04L 69/40* (2013.01)

(58) Field of Classification Search
CPC . H04L 41/0564; H04L 67/28; H04L 67/2861; H04L 69/40
See application file for complete search history.

(56) References Cited

U.S. PATENT DOCUMENTS

| | | | |
|---|---|---|---|
| 7,076,555 B1* | 7/2006 | Orman et al. | 709/227 |
| 2005/0281190 A1* | 12/2005 | McGee et al. | 370/216 |
| 2006/0018263 A1* | 1/2006 | McGee et al. | 370/241 |
| 2006/0159011 A1* | 7/2006 | Dalal et al. | 370/220 |
| 2009/0024722 A1* | 1/2009 | Sethuraman | H04L 12/2602 709/220 |
| 2012/0324110 A1* | 12/2012 | Kohli | H04L 63/0281 709/226 |
| 2013/0145072 A1* | 6/2013 | Venkataraghavan et al. | 710/316 |

* cited by examiner

*Primary Examiner* — Nicholas Taylor
*Assistant Examiner* — Afroza Sultana
(74) *Attorney, Agent, or Firm* — Blakely, Sokoloff, Taylor & Zafman LLP

(57) ABSTRACT

A method and apparatus of a device that notifies another device of a failed device is described. In an exemplary embodiment, a network element detects that a first device is unavailable, where the network element couples the first device to the second device. In response to detecting that the first device is unavailable, the network element configures a proxy for the first device. The network element additionally receives network data that is destined for the first device, where the second device originated the network data. If the proxy can process the network data, the network element transmits a response to the second device from the proxy, where the response indicates that the first device is unavailable, where the first response includes an address of the first device. If the proxy cannot process the network data, the network element drops the network data.

22 Claims, 8 Drawing Sheets

SYSTEM AND METHOD FOR DEVICE FAILURE NOTIFICATION

RELATED APPLICATIONS

Applicant claims the benefit of priority of prior, provisional application Ser. No. 61/784,712, filed Mar. 14, 2013, the entirety of which is incorporated by reference.

FIELD OF INVENTION

This invention relates generally to data networking and more particularly to configuring a proxy on a network element in response to a failure of a device connected to that network element, where the proxy is used to notify another device of the failed device.

BACKGROUND OF THE INVENTION

A source device can determine that a destination device is unavailable by a lack of response to network data that the source device transmits to the other device. If the destination device is unavailable, the source device may take a different action than continuing to send network data to the destination device. For example, if the source device is sending a Hypertext Transfer Protocol request for a web page to a server and the server does not respond, the source device can display an error to the user or can send the request to a different server. As another example, a source device sends a trade request to a trading server and this trading server is down, the source device can send the trade request to another trading server once the source device determines that the original trading server is not available.

A source device can take different actions to determine if the destination device is unavailable. For example, if the source device is transmitting Transmission Control Protocol (TCP) data to the destination device and does not receive a response within a specific timeout period, the source device increases a TCP retransmission timeout and resends the TCP data. If the destination device does not respond at all, the source device successively and exponentially increases the TCP retransmission timeout until the source device aborts the TCP connection with the destination device.

A problem with relying on a TCP retransmission timeout mechanism (or other timeout-based mechanisms) for determining if a destination device is unavailable is that these mechanisms rely on a timeout for lack of a response. This can delay the source device taking alternate actions if the destination device has failed or is otherwise unavailable.

SUMMARY OF THE DESCRIPTION

A method and apparatus of a device that notifies another device of a failed device is described. In an exemplary embodiment, a network element detects that a first device is unavailable, where the network element couples the first device to the second device. In response to detecting that the first device is unavailable, the network element configures a proxy for the first device. The network element additionally receives network data that is destined for the first device, where the second device originated the network data. If the proxy can process the network data, the network element transmits a response to the second device from the proxy, where the response indicates that the first device is unavailable and the response includes an address of the first device. If the proxy cannot process the network data, the network element drops the network data.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
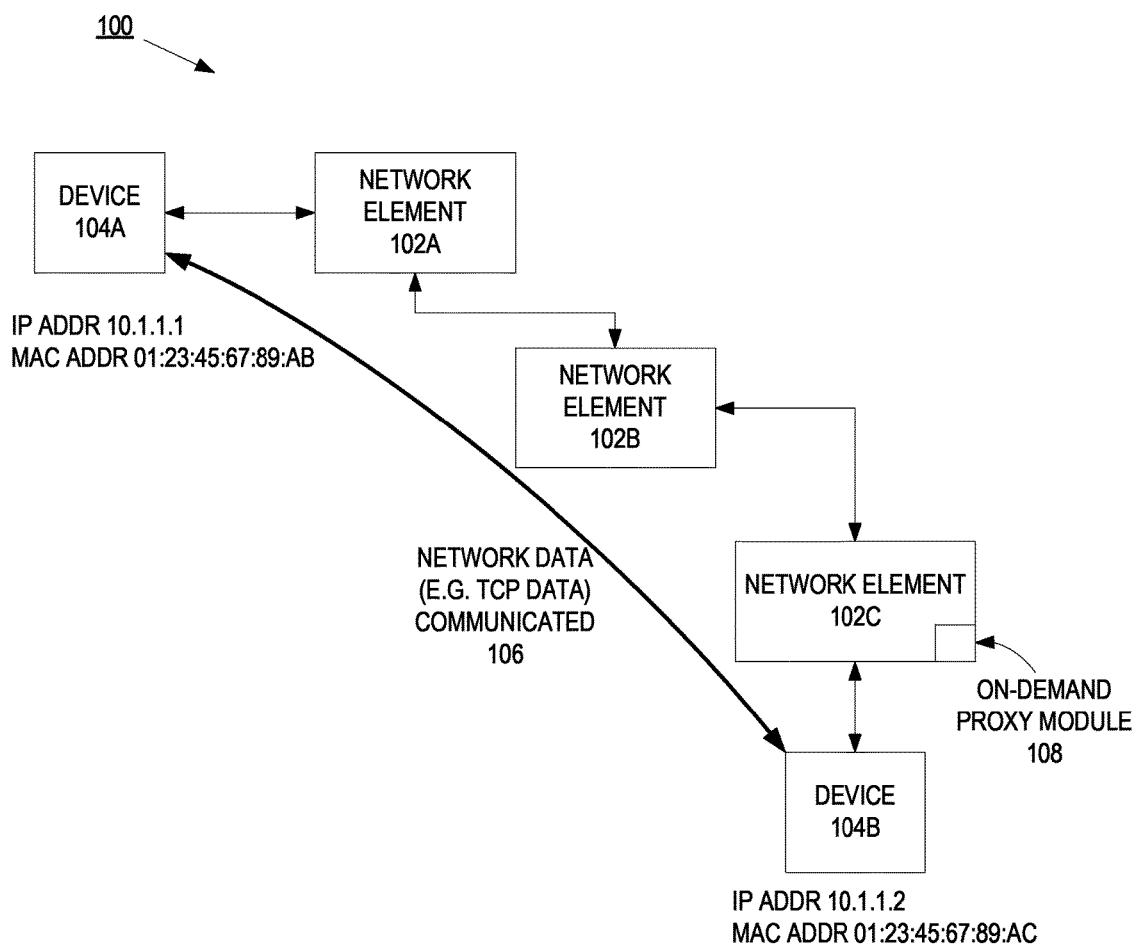
FIG. 1 is a block diagram of one embodiment of a system of two devices communicating with each other via multiple network elements.

A method and apparatus of a device that notifies another device of a failed device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that notifies another device of a failed device is described. In one embodiment, a network element discovers that a device attached to the network element has failed or is otherwise unavailable. The network element can discover the failed device due to a link loss between the network element and the device, because the device fails to send a heartbeat message over a time period, or that the device is otherwise unresponsive to the network element (e.g., lack of updates or some other regularly scheduled network data from the failed device). In response to the network element detecting the failed device, the network element configures a proxy for this device. In one embodiment, the proxy receives network data destined for the failed device and sends a response to the originator of the network data. The response can indicate that the failed device is not available or that the information being requested is available somewhere else (e.g. an Internet Control Message Protocol (ICMP) destination unreachable that is in response to a User Datagram Protocol (UDP) packet or other non-TCP Internet Protocol (IP) network data. In one embodiment, an example of non-TCP IP network data is an ICMP echo request.

In one embodiment, if the network data is Transmission Control Protocol (TCP) data that is being sent to the failed device, the proxy sends a TCP reset to the originator of the TCP data. In this embodiment, the device that receives the TCP reset will abort a TCP connection with the failed device. In another embodiment, the proxy can respond to data with other types of protocols (e.g., UDP, HTTP, RTP, RTSP, SIP, RAN, etc.). With the on-demand proxy responding the network data for the failed device, the proxy can notify the originating device of the network data in less time than a timeout-based mechanism. For example and in one embodiment, by relying on a TCP retransmission timeout mechanism and in absence of an application timeout, a device may determine that the destination device has failed in approximately 13-30 minutes. In contrast, the network element discovering the failed device and configuring a proxy can occur in approximately half of a round trip time for a packet to travel between the two devices. For example and in one embodiment, if the round trip time takes four microseconds, it would take approximately two microseconds for the network element to notify the destination device is unavailable.

FIG. 1 is a block diagram of one embodiment of a system 100 of two devices 104A-B communicating with each other via multiple network elements 102A-C. In FIG. 1, the devices 104A-B communicate network data 106 with each other using a network protocol via three network elements 102A-C. While in one embodiment, the pair of devices 104A-B are illustrated communicating via the three network elements 102A-C, in alternate embodiments, the pair of device can communicate via more or less network elements. In one embodiment, the network data is Transmission Control Protocol (TCP) data, in which a TCP connection is established between these two devices 104A-B. In another embodiment, the network data 106 is another type of protocol (e.g., User Datagram Protocol (UDP), Hypertext Transfer Protocol (HTTP), Real Time Protocol (RTP), Real Time Streaming Protocol (RTSP), Session Initiation Protocol (SIP), Radio Access Network (RAN), or another type of protocol). While in one embodiment, the interconnection between the network elements 102A-C and the network elements 102A-C and either device 106A-B is a wired connection (e.g., copper, fiber, etc.,), in alternate embodiments, a different type of interconnection is used (e.g., wireless, a combination of wireless and wired, etc.). In addition, the different types of protocols can be used to communicate network data over the connection (e.g., Ethernet, wireless, Synchronous Optical Networking (SONET), Fiber channel, Infiniband, etc.).

In one embodiment, each network element 102A-C is a device that provides network access to a network (e.g., physical network, virtualized network, etc.). A network element can be a switch, router, hub, bridge, gateway, etc., or any type of device that can allow access to a network. In one embodiment, any one of the network elements 102A-C can be a virtual machine. In one embodiment, the device 104A-B is any type of device that can communicate network data with another device (e.g., a personal computer, laptop, server, mobile device (e.g., phone, smartphone, personal gaming device, etc.), another network element, etc.). In one embodiment, the devices 104A-B can be a virtual machine or can be a device that hosts one or more virtual machines. In one embodiment, each device 104A-B has one or more addresses to identify this device. For example and in one embodiment, the device 104A has an IP address (10.1.1.1) and a Media Access Control (MAC) address (01:23:45:67:89:AB). The device 104B has addresses 10.1.1.2 (IP) and 01:23:45:67:89:AC (MAC).

In one embodiment, the network element 102C includes an on-demand proxy module 108. In this embodiment, the on-demand proxy module 108 determines if an attached device fails, detects network data destined for this failed device, and proxies a response for the failed device to the original sender of the network data. The on-demand proxy module 108 is further described in FIG. 2 below.

Figure 2:
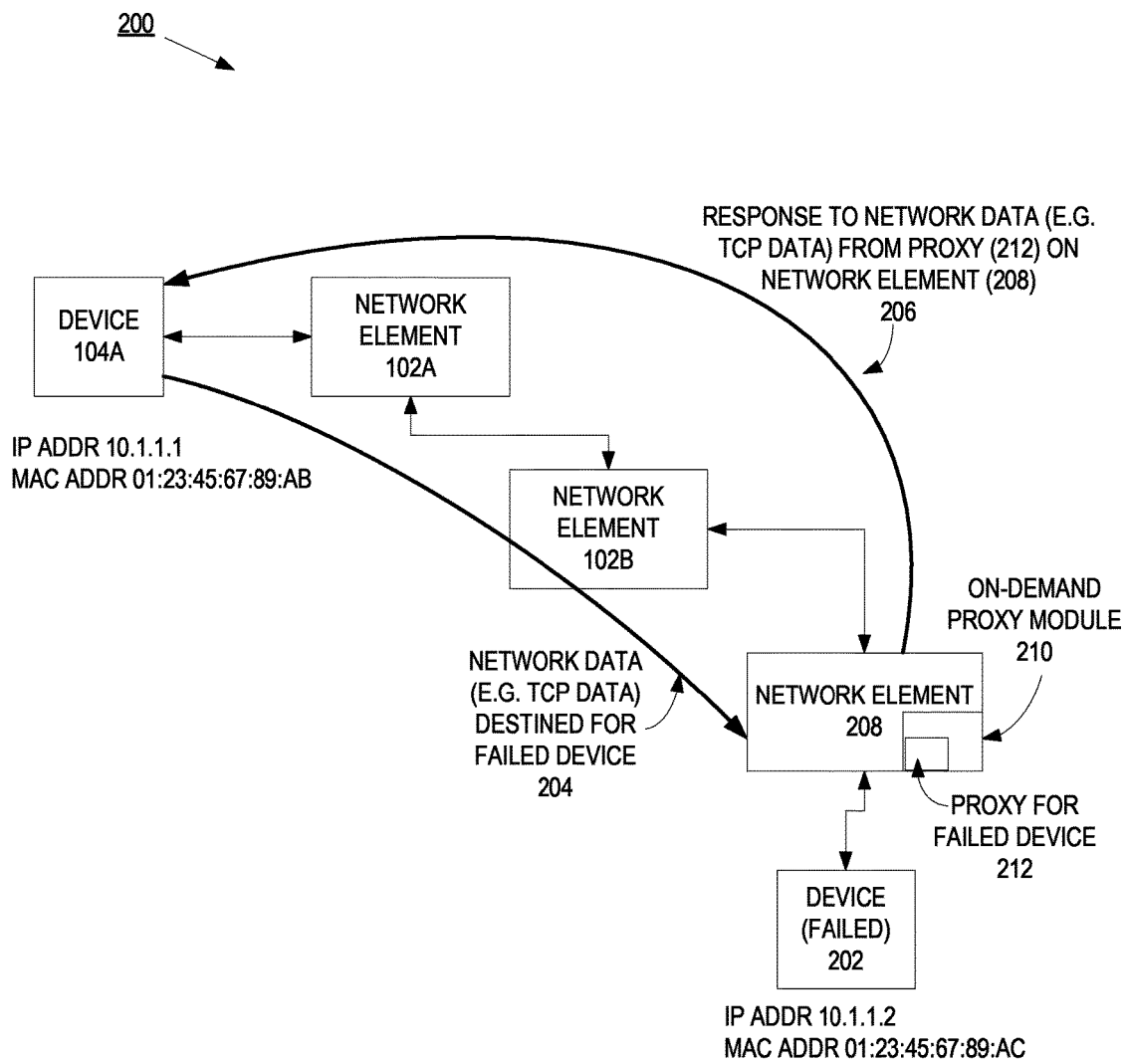
FIG. 2 is a block diagram of one embodiment of a system of a network element that proxies a response for a failed device.

FIG. 2 is a block diagram of one embodiment of a system 200 of a network element 202C that proxies a response for a failed device 202. In FIG. 2, device 104A communicates network data 204 that is destined for the failed device 202. The device 104A has an IP address (10.1.1.1) and a MAC address (01:23:45:67:89:AB). The device 202 has addresses 10.1.1.2 (IP) and 01:23:45:67:89:AC (MAC). In one embodiment, the network element 208 attached to the device 202 determines that the device 202 has failed. In one embodiment, the device 202 is considered failed if there is a loss of communication between the network element 208 and the device 202. In this embodiment, a loss communication can occur because of a link loss between the network element 208 and the device 202, the device 202 has crashed or rebooted, or the device 202 is otherwise unavailable. In one embodiment, the network element 208 can discover the failed device due to a link loss between the network element 208 and the device 202, because the device 202 fails to send a heartbeat message over a time period, or that the device 202 is otherwise unresponsive to the network element 208 (e.g., lack of updates or some other regularly scheduled network data from the failed device). While in one embodiment, the device 202 is illustrated as being directly connected to the network element, in other embodiments, there can be one or more intervening devices between the network element 208 and the device 202.

In one embodiment, the network element 208 includes an on-demand proxy module 210. In this embodiment, the on-demand proxy module 210 determines if a coupled device 210 fails, detects network data destined for this failed device, and proxies a response for the failed device to the original sender of the network data.

In one embodiment and in response to the determination that the device 202 has failed, the on-demand proxy module 210 configures a proxy for the failed device 202 by assuming the addresses of the failed device 202 (e.g., an IP address of 10.1.1.2 and a MAC address of 01:23:45:67:89:AC). Because the proxy 212 has the addresses of the failed device 202, a response from the proxy 212 appears to be coming from the failed device 202. In one embodiment, by assuming the addresses of the failed device 202, the network element 208 can advertise that the network element is the device with the assumed addresses to other switching components of the network element and/or to other network elements in the network. For example and in one embodiment, if the network element includes multiple switching components (e.g. multiple line cards), the network element advertises to that this network element is now the destination for the assumed addresses to the switching components of the network element. As another example and in another embodiment, the network element advertises this network element is now the destination device for the assumed addresses to other network elements in the network using an address announcement or routing protocol (e.g., Address Resolution Protocol (ARP), Neighborhood Routing Protocol (NDP), Border Gateway Protocol (BGP), Open Shortest Path First (OSPF), Intermediate System to Intermediate System (IS-IS), Locator/Identifier Separation Protocol (LISP), and/or another address announcement or routing protocol).

In another embodiment, in addition to assuming the addresses, the on-demand proxy module 210 configures the kernel of the network element 208 to handle certain types of network traffic. For example and in one embodiment, the on-demand proxy module 210 configures the kernel to respond to TCP network data with a TCP reset and/or to UDP network data with an ICMP destination unreachable that is in response to UDP network data (or other non-TCP IP network data). In addition, the proxy 212 for the failed device 202 sends a response 206 to the network data from the proxy 212 on the network element 208 that indicates that the device 202 is not available or that the information being requested by the device 104A is available somewhere else.

In one embodiment, the type of response depends on the type of network data that is being received by the network element 208 for the failed device 202. For example and in one embodiment, if the network data 204 is TCP data, a response from the proxy 212 to the device 104A is a TCP reset packet. A TCP reset packet indicates to the device 104A to abort the TCP connection with the failed device 202. In one embodiment, without the TCP reset response from that proxy 212, because the device 202 has failed, the device 104A does not receive a TCP response for the TCP data sent to the failed device 202. In this embodiment, the device 104A exponentially increases the TCP retransmission timeout and re-transmits that TCP data. This sequence of exponentially increasing the TCP retransmission timeout continues until the device 104A closes the TCP connection with the failed device 202. Alternatively, an application on the device 104A that is sending the TCP data can manage the lack of TCP response using some other timeout-based mechanism. Closing the connection allows the device 104A to take alternate action in case of the device 202 failing or otherwise unavailable.

While this sequence of increasing the TCP retransmission timeout leads to an eventual closing of the TCP connection between the device 104A and the failed device 202, this sequence can take a long time to close this TCP connection. In one embodiment, by using the proxy 212 is the network element 208, the time taken for the device 104A to close the TCP connection with the failed device 202 is considerably less. In this embodiment, this allows the device 104A to fail over more quickly to an alternative action in the case of the device 202 failing.

In another embodiment, if the network data 204 is another type of protocol (e.g., UDP, HTTP, RTP, RTSP, SIP, RAN, etc.), the proxy 212 sends a corresponding response 206 that indicates that the failed device 202 is not available or that the information being requested is available somewhere else. For example and in one embodiment, if the network data 204 is an HTTP request, the proxy response could be a HTTP server error response (e.g., an HTTP 503 response code) or an HTTP redirection (e.g., a HTTP 300-level response code). In another example and embodiment, if the network data is UDP or other non-TCP IP data, the proxy response can be an ICMP destination unreachable destination response. In another embodiment, when the network element detects that the destination device is dead or otherwise unavailable, the network element can add or modify a route, either a static route, or a route propagated via an IGP (Interior Gateway Protocol) such as OSPF or IS-IS, or via an EGP (Exterior Gateway Protocol) such as BGP. In this embodiment, the route would thus redirect the traffic destined to the IP address of the failed device to another device. This other device can be the network element or a device that is different from the network element. For example and in one embodiment, there is an HTTP service with stringent availability requirements and multiple servers. If one of the servers fails, it may take a few seconds for a high availability system to detect the failure and redirect the new incoming traffic to the standby HTTP server. The network element can detect and redirect the traffic with a route to the standby HTTP server as soon as the port coupled to the failed server goes down, thereby reducing the window of unavailability of the service during failover.

In one embodiment, for TCP, this mechanism is not useful unless the other device is synchronizing TCP states with the failed device (e.g. via a mechanism such as pfsync). Configuring a proxy and generating a response for the failed device is further described in FIGS. 3 and 4 below.

Figure 3:
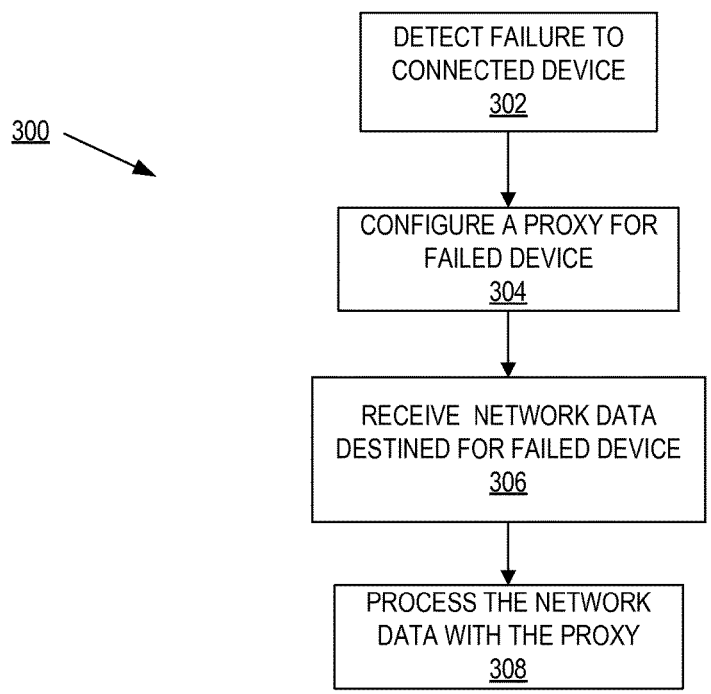
FIG. 3 is a flow diagram of one embodiment of a process to detect a failed device and configure a proxy for the failed device.

FIG. 3 is a flow diagram of one embodiment of a process 300 to detect a failed device and configure a proxy for the failed device. In one embodiment, process 300 is performed by an on-demand proxy module to detect a failed device and configure a proxy for the failed device, such as the on-demand proxy module 210 of FIG. 2 above. In FIG. 3, process 300 begins by detecting a failure of a connected device at block 302. In one embodiment, the device can fail due to a loss of connection between the device and the network element connected to the device or can be due to the device itself failing (e.g., rebooting, crashing, unable to respond, etc.). For example and in one embodiment, process 300 detects that the device 202 of FIG. 2 is down or otherwise unavailable as described in FIG. 2 above. In another embodiment, process 300 detects that the connected device is not available if there are no other active paths to the connected device. For example and in one embodiment, if there are alternate paths available (e.g., via Multi-Chassis Link Aggregation), process 300 would not designate the connected device as unconnected. In one embodiment, if the connected device was unavailable and there were no other active paths to connected device, process 300 designates this device as a failed device. In one embodiment, instead of determining the device is down based on an immediate link loss, process 300 delays for a time period before determining that the device is down. In this embodiment, process 300 delays the determination in the case in which the link loss is due to a brief flapping of the link between the network element and the device. For example and in one embodiment, process 300 delays the determination for a short time period (e.g., 10-30 seconds) so as not to spuriously reset TCP flows if the link the briefly flapping.

At block 304, process 300 configures a proxy for the failed device. In one embodiment, the proxy is a configuration of the network element that assumes one or more addresses of the failed device, receives the network data destined for the failed devices, and generates a response to the received network data. In one embodiment, process 300 configures the proxy by assigning one or more addresses of the failed device to the proxy. By configuring the proxy in response to process 300 detecting that the device is failed or unavailable, process 300 creates an on-demand proxy for the failed device. For example and in one embodiment, if the failed device has an IP address of 10.1.1.2 and a MAC address of 01:23:45:67:89:AC, process 300 assigns one or more of these addresses to the proxy. In one embodiment, process 300 retrieves the address information for the failed device based on the port the failed device was attached to and the forwarding table of the network element. In one embodiment, process 300 configures the kernel of the network element to handle certain types of network traffic. For example and in one embodiment, process 300 configures the kernel to respond to TCP network data with a TCP reset and/or to UDP network data with an Internet Control Message Protocol (ICMP) destination unreachable that is in response to a User Datagram Protocol (UDP) network data. In another embodiment, process 300 configures and/or launches another process to handle network data such as HTTP, RTP, RTSP, SIP, RAN, or other types of protocols. Process 300 receives the network data destined for the failed device.

At block 308, process 300 processes the received network data using the proxy. In one embodiment, process 300 generates a response to the received network data that indicates that the failed device is not available or that the information being requested is available somewhere else. Processing the received network data is further described in FIG. 4 below.

Figure 4:
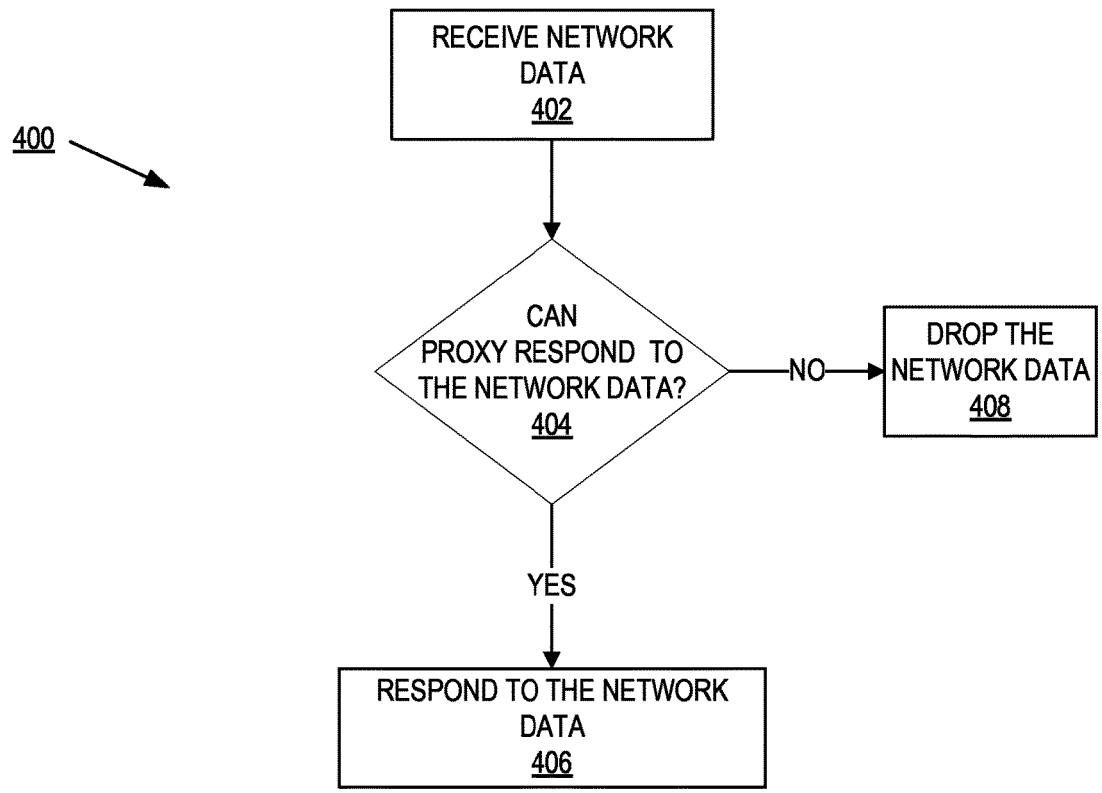
FIG. 4 is a flow diagram of one embodiment of a process to generate a response to network data destined for the failed device with the proxy.

FIG. 4 is a flow diagram of one embodiment of a process 400 to generate a response to network data destined for the failed device with the proxy. In one embodiment, process 400 is performed by process 300 to generate a response to the network data destined for the failed device at block 308 of FIG. 3 above. In FIG. 4, process 400 receives the network data that is destined for the failed device at block 402. In one embodiment, the network data is the network data that is received by the network element and is processed by the proxy for the failed device as described in FIG. 2 above. At block 404, process 400 determines if the proxy can respond the network data. In one embodiment, process 400 can generate a response for TCP, UDP, HTTP, RTP, RTSP, SIP, RAN, or other types of protocols, where the response indicates that the failed device is not available or that the information being requested is available somewhere else. For the types of data that process 400 cannot respond to, process 400 drops the data at block 408. If process 400 can respond to the network data, at block 406, process 400 responds to the network data. In one embodiment, if the network data is TCP data, process 400 sends a TCP reset to the originator of the data. In a further embodiment, if the network data is UDP data, process 400 sends an ICMP destination unreachable to the originator of the data. In another embodiment, if the network data is an HTTP request, process 400 sends a HTTP response such as a HTTP server error response (e.g., an HTTP 503 response code) or an HTTP redirection (e.g., a HTTP 300-level response code).

Figure 5:
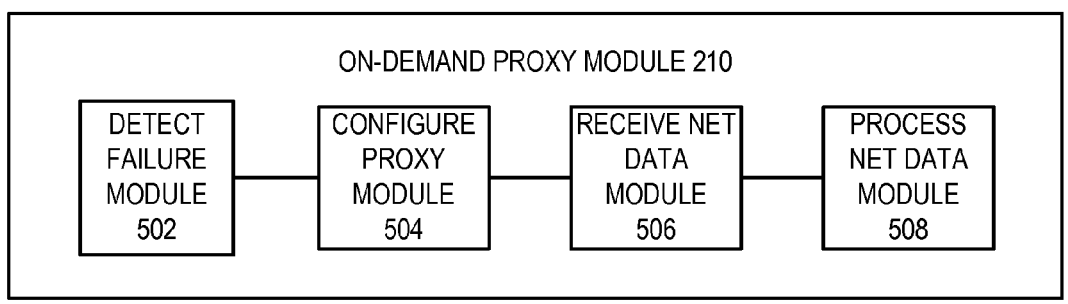
FIG. 5 is a block diagram of an on-demand proxy module that detects a failed device and configures a proxy for the failed device.

FIG. 5 is a block diagram of an on-demand proxy module 210 that detects a failed device and configures a proxy for the failed device. In one embodiment, the on-demand proxy module 210 includes the detect failure module 502, configure proxy module 504, receive network data module 506, and process network data module 508. In one embodiment, the detect failure module 502 detects a failure of a connected device as described in FIG. 3, block 302 above. The configure proxy module 504 configures a proxy for the failed device as described in FIG. 3, block 304 above. The receive network data module 506 receives the network data destined for the failed device as described in FIG. 3, block 306 above. The process network data module 508 processes the network data as described in FIG. 3, block 308 above.

Figure 6:
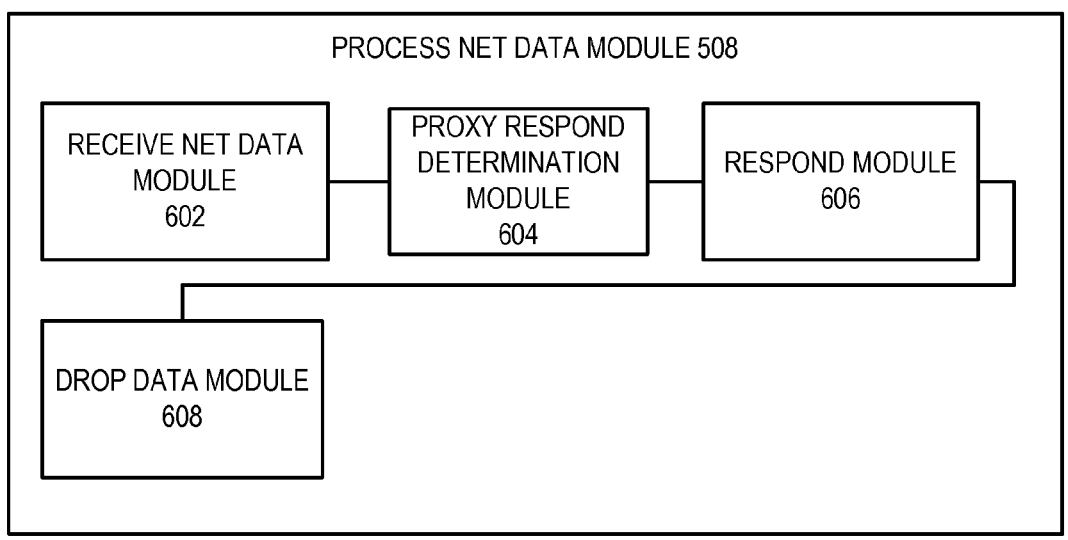
FIG. 6 is a block diagram of a process network data module that processes network data destined for the failed device with the proxy.

FIG. 6 is a block diagram of a process network data module 508 that processes network data destined for the failed device with the proxy. In one embodiment, the process network data module 508 includes a receive network data module 602, proxy response determination module 604, response module 606, and drop data module 608. In one embodiment, the receive network data module 602 receives the network data as described in FIG. 4, block 402 above. The proxy response determination module 604 determines if the proxy can respond to the network data as described in FIG. 4, block 404 above. The response module 606 prepares and sends a response as described in FIG. 4, block 406 above. The drop data module 608 drops the network data as described in FIG. 4, block 408 above.

Figure 7:
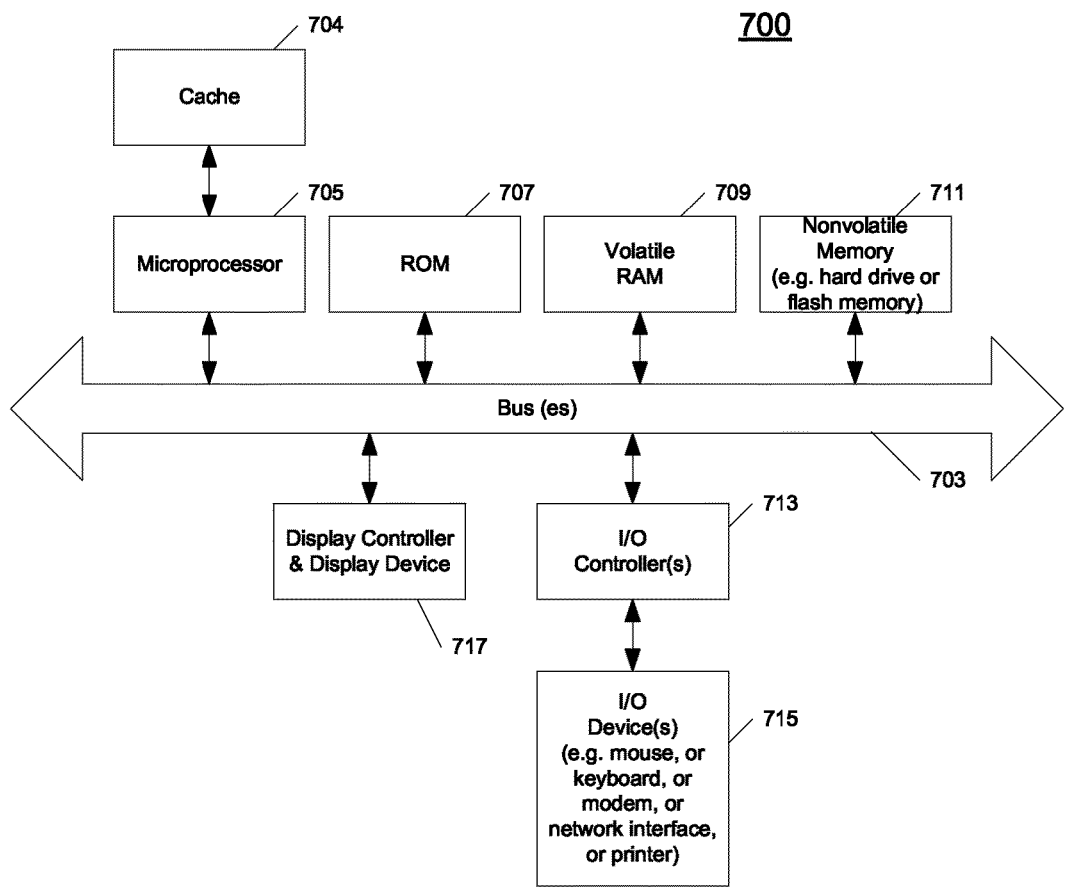
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a network element 208 as shown in FIG. 2. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 715 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 717. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM/ROM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
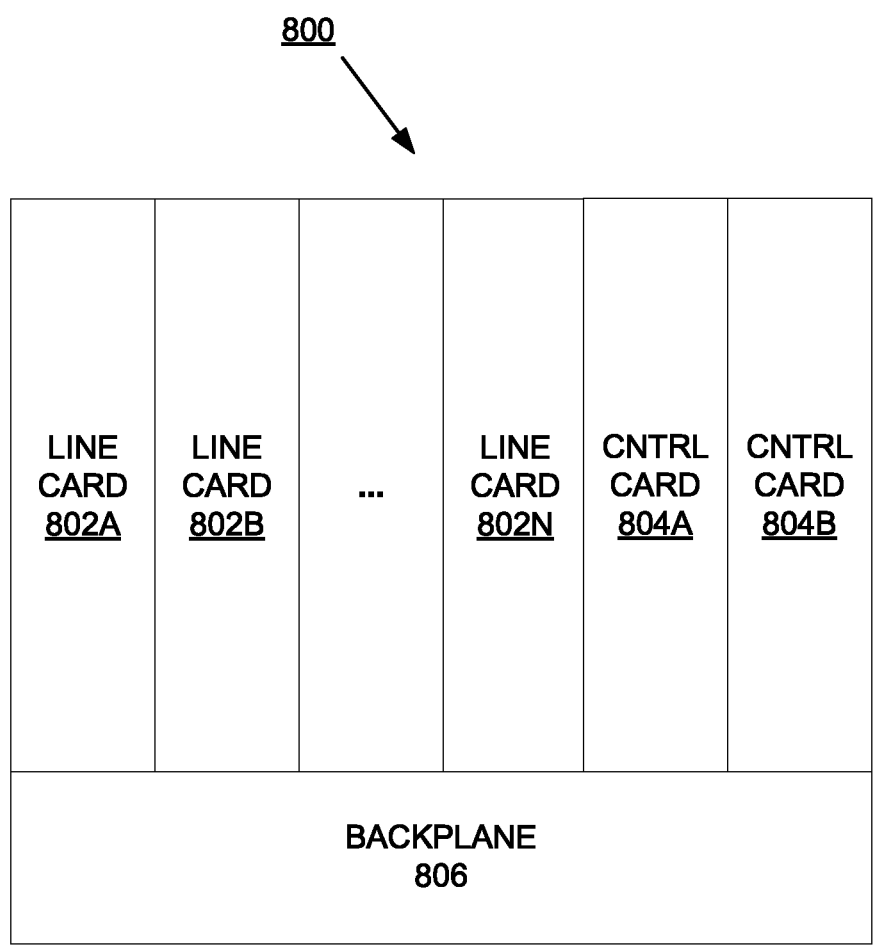
FIG. 8 is a block diagram of one embodiment of an exemplary network element that notifies another device of a failed device.

FIG. 8 is a block diagram of one embodiment of an exemplary network element 800 that notifies another device of a failed device according to one embodiment of the system. In FIG. 8, the backplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., notifying another device of a failed device, etc.). In one embodiment, the line cards 802A-N process and forward traffic according to the network policies received from controller cards the 804A-B. In one embodiment, the controller cards 804A-B notifies another device of a failed device that is connected to a port of one of the line cards 802A-N as described in FIGS. 3 and 4. In this embodiment, one or both of the controller cards 4. includes on-demand proxy module to notify another device of a failed device, such as the on-demand proxy module 210 as described in FIG. 2 above. In another embodiment, the line cards 802A-N notify another device of a failed device that is connected to one of the ports of a respective line card 802A-N in FIGS. 3 and 4. It should be understood that the architecture of the network element 800 illustrated in FIG. 8 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "receiving," "determining," "transmitting," "sending," "forwarding," "configuring," "dropping," "communicating," "creating," "assigning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to notify an unavailability of a first device to a second device, the method comprising:
   detecting, with a network element, that the first device is unavailable, wherein the network element is coupled to the first device and the second device and the first and second device communicate via the network element using a network connection; and
   in response to the detecting that the first device is unavailable,
      designating, with the network element, the first device as a failed device,
      configuring, with the network element, a proxy for the first device on the network element with an address of the first device, wherein the proxy indicates to the second device that the first device is unavailable,
      receiving network data destined to the first device without forwarding the network data to the first device, wherein the second device originated the network data,
      if the proxy can process the network data,
         transmitting a Transmission Control Protocol (TCP) reset to the second device from the proxy, wherein the response indicates that the first device is unavailable and the response includes the address of the first device, and
      if the proxy cannot process the network data,
         dropping the network data.

2. The non-transitory machine-readable medium of claim 1, wherein the network connection is a TCP network connection.

3. The non-transitory machine-readable medium of claim 1, wherein the network data is selected from the group consisting of User Datagram Protocol network data and other non-Transmission Control Protocol Internet Protocol network data.

4. The non-transitory machine-readable medium of claim 3, wherein the response is an Internet Control Message Protocol destination unreachable response.

5. The non-transitory machine-readable medium of claim 1, wherein the configuring of the proxy comprises:
   assigning the address of the first device to the proxy.

6. The non-transitory machine-readable medium of claim 1, wherein the address of the first device is selected from a group consisting of a Media Access Control address and an Internet Protocol address.

7. The non-transitory machine-readable medium of claim 1, wherein the detecting that the first device is unavailable comprises:
   detecting a link loss between the network element and the first device.

8. The non-transitory machine-readable medium of claim 1, wherein the detecting that the first device is unavailable comprises:
   determining that a heartbeat message has not been received from the first device over a time period.

9. The non-transitory machine-readable medium of claim 1, wherein the response is an indication to redirect subsequent network data from the second device to a third device.

10. The non-transitory machine-readable medium of claim 1, wherein the network element is selected from the group consisting of a switch, a router, and a gateway.

11. The non-transitory machine-readable medium of claim 1, wherein the network element is a virtual device.

12. The non-transitory machine-readable medium of claim 1, wherein the first device is a virtual machine.

13. The non-transitory machine-readable medium of claim 1, wherein the network data is selected form the group consisting of Hypertext Transport Protocol network data, Real Time Protocol network data, Real Time Streaming Protocol network data, Session Initiation Protocol network data, and Radio Access Network network data.

14. The non-transitory machine-readable medium of claim 1, wherein configuring the proxy comprises:
   adding a route to a routing table that would redirect the traffic destined to the address of the first device to another device.

15. A method to notify an unavailability of a first device to a second device, the method comprising:
   detecting, with a network element, that the first device is unavailable, wherein the network element is coupled to the first device and the second device and the first and second device communicate via the network element using a network connection; and
   in response to the detecting that the first device is unavailable,
      designating, with a network element, the first device as a failed device,
      configuring, with the network element, a proxy for the first device on the network element with an address of the first device, wherein the proxy indicates to the second device that the first device is unavailable,
      receiving network data destined to the first device without forwarding the network data to the first device, wherein the second device originated the network data, if the proxy can process the network data,
         transmitting a Transmission Control Protocol (TCP) reset to the second device from the proxy, wherein the response indicates that the first device is unavailable and the response includes the address of the first device, and
      if the proxy cannot process the network data, dropping the network data.

16. The method of claim 15, wherein the network connection is a TCP network connection.

17. The method of claim 15, wherein the network data is selected from a group consisting of User Datagram Protocol network data and other non-Transmission Control Protocol Internet Protocol network data.

18. The method of claim 17, wherein the response is an Internet Control Message Protocol destination unreachable response.

19. The method of claim 15, wherein the configuring of the proxy comprises:
assigning the address of the first device to the proxy.

20. A system to notify an unavailability of a first device to a second device, the system comprising:
the first device;
the second device, wherein the second device sends network data to the first device; and
a network element, coupled to the first and second devices, wherein the network element notifies an unavailability of a first device to a second device, the first and second device communicate via the network element using a network connection, and the network element includes,
an on-demand proxy module to configure a proxy for the first device, wherein the on-demand proxy module detects that the first device is unavailable and, in response to the detecting that the first device is unavailable, the on-demand proxy module further designates the first device as a failed device, configures a proxy for the first device with an address of the first device, and receives the network data destined to the first device without forwarding the network data to the first device, and
a proxy, coupled to the on-demand proxy module, wherein the proxy, if the proxy can process the network data, transmits a Transmission Control Protocol (TCP) reset to the second device from the proxy, wherein the response indicates that the first device is unavailable and the response includes the address of the first device, and, if the proxy cannot process the network data, drops the network data, wherein the proxy indicates to the second device that the first device is unavailable.

21. A network element to notify an unavailability of a first device to a second device, the system comprising:
a processor;
a memory coupled to the processor through a bus; and
a process executed from the memory by the processor to cause the processor to detect, that the first device is unavailable, wherein the network element is coupled to the first device and the second device and the first and second device communicate via the network element using a network connection, and in response to the detecting that the first device is unavailable, designate the first device as a failed device, configure a proxy for the first device on the network element with an address of the first device, receive the network data destined to the first device without forwarding the network data to the first device, wherein the second device originated the network data, if the proxy can process the network data, transmit a Transmission Control Protocol (TCP) reset to the second device from the proxy, wherein the response indicates that the first device is unavailable and the response includes the address of the first device, and if the proxy cannot process the network data, drop the network data, wherein the proxy indicates to the second device that the first device is unavailable.

22. The network element of claim 21, wherein the network connection is a TCP network connection.

* * * * *